United States Patent Office 3,011,860
Patented Dec. 5, 1961

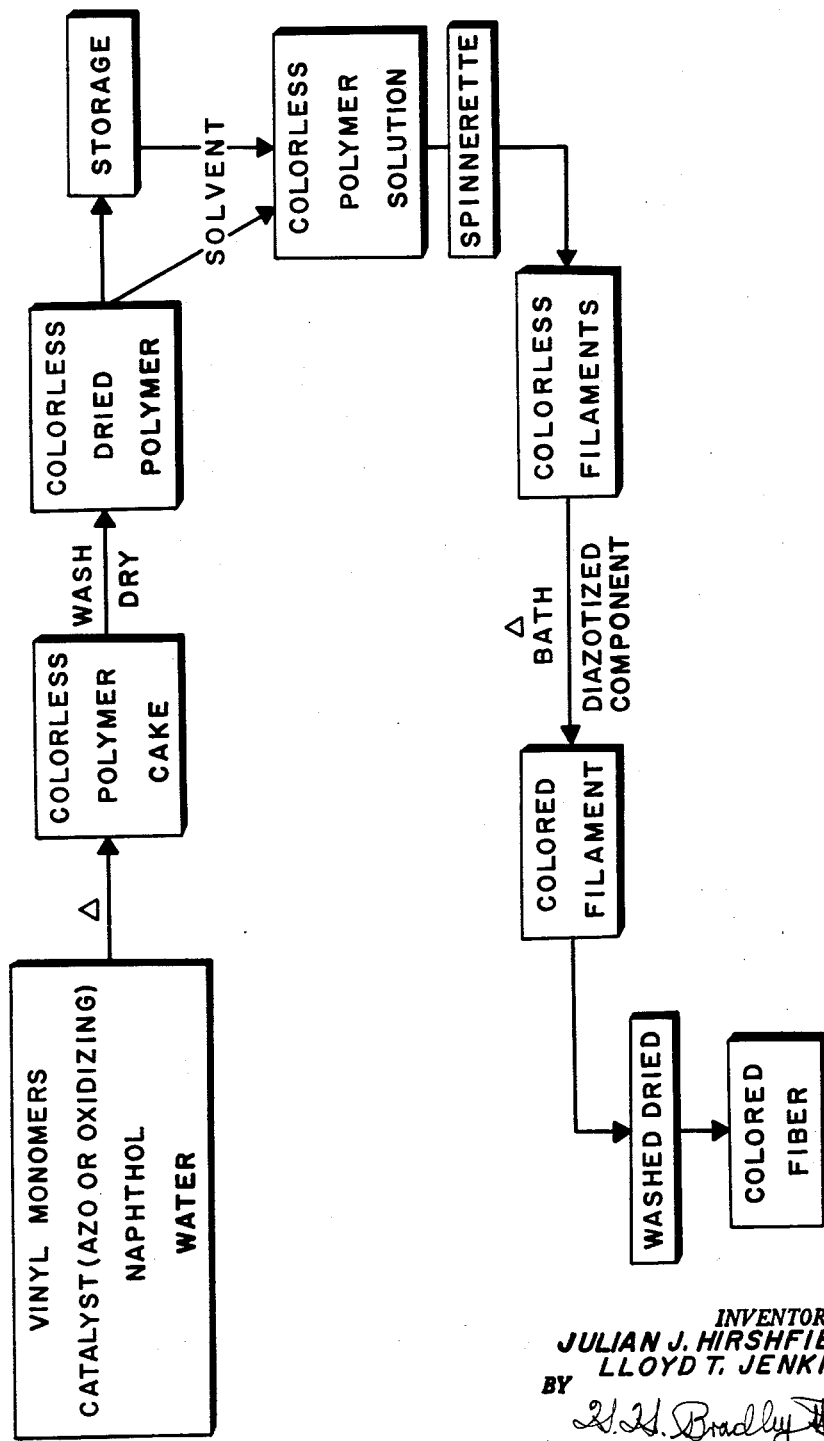

3,011,860
PRODUCTION OF VINYL POLYMERS CONTAINING A NAPHTHOL COUPLING COMPONENT
Julian J. Hirshfeld and Lloyd T. Jenkins, Decatur, Ala., assignors to The Chemstrand Corporation, Decatur, Ala., a corporation of Delaware
Filed Sept. 10, 1958, Ser. No. 760,097
7 Claims. (Cl. 18—54)

This invention relates to the production of a dyeable vinyl polymer and is more particularly concerned with the preparation of a new vinyl polymer and a process for dyeing same.

The newer synthetic fibers, particularly those formed from vinyl polymers, can not be easily dyed. It is thought that this is due to the lack of reactive sites on which the adsorption of dye molecules can take place and the lack of pores or amorphous regions which permit dyes to diffuse into the fiber at a reasonable rate. There is disclosed in the art various methods of increasing the number of dye sites in the molecular structure of the synthetic fibers to accelerate the rate of dyeing. In another direction, important research led to the introduction of hydrophilic groups into the molecule of the fiber which promote swelling of the fiber in the dye bath and hence permit a greater permeability of the dye into the fiber structure. Another known expedient to encourage dye penetration is to open the fiber structure by the action of swelling agents.

In U.S. Patent No. 2,431,956, there is described a process of dyeing a synthetic yarn by treating a gel polyacrylonitrile yarn with a naphthol type dye and thereafter developing a color therein by coupling the dye with a diazotized base. Being in a gel state, the yarn is more permeable to the dyeing components. While this patented method represents an improvement over dyeing finished yarn with such dye materials, unfortunately, the lightfastness of the yarn so treated is not entirely satisfactory.

Synthetic fibers have been colored by the so-called dope dyeing process wherein an insoluble colored pigment is incorporated into the polymer during the polymerization thereof or while the polymer is in a molten condition. In this method of dyeing it is difficult to get a uniform dispersion of the pigment in the polymer, and the number of colors one may obtain is limited.

It is an object of this invention to provide a vinyl polymer having a naphthol dyeing component chemically bound in the polymer and being capable of coupling in situ with diazotized bases to develop readily and successfully a variety of colors therein. It is another object of this invention to provide a process for preparing a vinyl polymer having a naphthol dye component chemically bound in the polymer. It is still another object of this invention to provide a process of preparing and uniformly dyeing a vinyl polymer that has fiber-forming properties. It is yet another object of this invention to provide a process for uniformly and readily dyeing polyacrylonitrile fibers that possess very good lightfastness. Other objects will become apparent from the following detailed description.

In accordance with the present invention, as shown by the flow sheet, a naphthol dye coupling component is mixed with one or more vinyl monomers having the general structure $>C=C<$ and capable of undergoing addition polymerization to form high molecular weight linear polymers. The resulting mixture is polymerized according to known methods to form a useful polymeric composition. After the composition is purified, it is immersed in a bath containing a diazotized base component under such conditions that the naphthol couples with the base to produce a very good lightfast color therein. In view of the many possible combinations of base and dye components, dyeing flexibility over almost unlimited range of colors is obtained.

Examples of the class of vinyl monomers as just described above include: the aryl olefines such as styrene, the chlorostyrenes, p-methoxy styrene, alpha-methylstyrene, vinyl napthalene, and the like; acrylic acid and substituted acrylic acids and their esters, nitriles, and amides such as acrylic acid, methacrylic acid, methyl acrylate, ethyl acrylate, isobutyl acrylate, methyl-alpha-chloroacrylate, methyl methacrylate, ethyl methacrylate, butyl methacrylate, methacrylamide, and the like; methyl isopropenyl ketone, methyl vinyl ketone, methyl vinyl ether, vinyl ethenyl carbinols, vinylidene chloride, vinylpyridine, vinyl acetate, vinyl chloride, vinyl furane, vinyl carbazole, fumaric acid esters, diallyl maleate, vinyl acetylene and esters, alcohols, acids, ethers, and the like of the type described.

The naphthol coupling component within the scope of the present invention includes the coupling components used in the naphthol dyeing process and described, for example, in "The Chemical Technology of Dyeing and Printing," pages 348–363, written by Dr. Louis Diserens and published by Reinhold Publishing Corporation (1948). Among these components are β-naphthol; 2-naphthol-7 sulfonic acid; 6-amino and 7-amino-α-naphthols; a mixture of 2,3 oxynaphthoic acid, β-naphthol, and 2-naphthol-7 sulfonic acid; 6-amino α-naphthol; 8-amino-α-naphthol; acetyl derivatives of 4-amino-α-naphthol; anilide of 2,3-oxynaphthoic acid; p-nitranilide of 2,3-oxynaphthoic acid; o-toluidide of 2,3-oxynaphthoic acid; o-anisidide of 2,3-oxynaphthoic acid; p-anisidide of 2,3-oxynaphthoic acid; m-nitranilide of 2,3-oxynaphthoic acid; α-naphthalide of 2,3-oxynaphthoic acid; 4-chloro-o-toluidide of 2,3-oxynaphthoic acid; β-naphthalide of 2,3-oxynaphthoic acid; m-chloro-o-anisidide of 2,3-oxynaphthoic acid; o-chloroanilide of 2,3-oxynaphthoic acid; p-methoxy-o-toluidide of 2,3-oxynaphthoic acid; 2,5-dimethoxyanilide of 2-oxydibenzofurane-3-carboxylic acid; 2,5-dimethoxyanilide of 2,3-oxynaphthoic acid; and others of the type capable of producing insoluble azo dyestuffs but which is not itself diazotized. Mixtures of these naphthols have particular utility in the formation of certain desirable colors. Of these coupling agents, derivatives of oxynaphthoic acid, especially the anilides of 2,3-oxynaphthoic acid, give good all around fastness to light.

The base component includes the known naphthol bases used in the naphthol dyeing technique and described in the just-mentioned text on pages 364–409. Among these base components are o-chloroaniline hydrochloride; o-chloroaniline; m-chloroaniline hydrochloride; m-chloroaniline; o-nitraniline; m-nitraniline; o-chloro-p-anisidine; 2,5 dichloroaniline hydrochloride; 2,5-dichloroaniline sulfate; p-nitro-o-toluidine; m-nitro-o-anisidine; 5 amino-2-benzoyl amino-1,4-diethoxy benzene; o-chloroo-aniside hydrochloride; 6-benzoylamino-4-methoxy-m-toluidine; p-chloro-o-toluidine hydrochloride; dianisidine; and others of type capable of being diazotized and coupling with the aforedescribed naphthol coupling components. It will be appreciated that any combination of such naphthol coupling components and such naphthol base components which will couple to give a useful color in the polymer may be used.

The amount of naphthol coupling component employed may vary depending upon the chemical composition of the molecular weight of the polymer and the intensity of the ultimate color desired. Obviously, employing the naphthol coupling component in large excess of that which will combine in the polymer results in a waste of material, since uncombined component will not produce a color that is as fast as the color produced when the coupling component is chemically combined in the polymer. It has been found that amounts of 0.5 percent to 6.0 percent of the coupling component based on the weight of the polymer ordinarily give the best results.

While the invention has utility in the production of colored polymeric articles including polymers of relatively low molecular weight that may be useful in the manufacture of coating compositions, lacquers and the like, however, it is particularly useful where the vinyl polymer has film- and fiber-forming properties or can be molded, for example, by the injection-molding technique into shaped objects. Examples of these vinyl polymers include polystyrene and related polymer; methacrylic and acrylic ester polymers; acrylonitrile, acrylic acid and related polymers; vinyl acetate polymers; vinyl chloride polymers; vinylidene chloride polymers; vinylidene fluoride polymers, vinylidene cyanide polymers, ethylene and propylene polymers; polytetrafluoroethylene, and the like. Furthermore, copolymers, terpolymers, and blends of these vinyl polymers, together with polymers thereof copolymerized with other polymerizable olefinic materials may be satisfactorily dyed by the instant process.

The vinyl polymers may be prepared by methods known to produce such polymers. However, in the instant invention the naphthol coupling component is incorporated into the polymerization mass before polymerization thereof has started or before polymerization has proceeded to a substantial extent. A polymer can be prepared by solution, aqueous emulsion, aqueous suspension, or mass type reaction techniques. The polymer preferably has a molecular weight of at least 10,000 and may be as high as 250,000 or higher, the molecular weight being determined by conventional viscosity measurements.

Analysis of the polymer shows that the naphthol coupling component forms an integral part of the molecular chain of the polymer with the component apparently being chemically bound to the ends of the molecular chain and functioning as chain terminators. A further indication that the coupling component is chemically bound in the polymer molecule is that the naphthol coupling component does not become disassociated from the polymer in solvents for the polymer and the coupling component. The polymeric product obtained by the process of the present invention is suitable for applications as molding, casting, and filament formation in the plastics field by conventional techniques; and under such conditions the coupling component remains an integral part of the molecular chain.

After polymerization thereof, the polymer modified with the coupling component is purified and bleached if necessary. Thereafter the polymer, either before or after being shaped into an object such as fibers, filaments, pellicles, film, tubing, and the like, is brought into contact with the base component under conditions that the naphthol coupling component connects therewith to develop a color in the polymer that is highly resistant to degradation by light. In order to form such a connection, the base component must be changed into a diazo compound by the action of free nitrous acid. This diazotization of the base component may be accomplished either in or not in the presence of the polymer containing the coupling component. It will be appreciated that the amount of base component is dependent upon the amount of coupling component incorporated in the polymer. Ordinarily, for each part of naphthol coupling component it is best to employ about 0.85–1.5 parts of base.

According to one embodiment an aqueous bath containing a diazotizable base component is prepared by dispersing the component in water with a suitable dispersing agent being used as needed. A solution is made acidic by the use of an acid, either organic or inorganic, that will decompose a suitable metal nitrite into nitrous acid; a resulting solution having a pH of 3.5–4.5 is satisfactory. The polymer structure is then immersed in the bath with the base which is brought to a temperature preferably, at or near the bath's boiling point, for at least 20–30 minutes or longer. After cooling the bath to 120° F. or less, preferably less than 80° F., an alkali metal nitrite preferably sodium nitrite in the amount of about 7–9 percent based on the weight of the polymer structure is added to the bath. The bath is then raised slowly to a temperature between 180°–190° F. or up to the boiling point which is maintained for about 15 minutes or more to complete the coupling of the naphthol coupling component with the base component and thus to develop the color. Finally the colored structure is scoured with warm soap and water to remove the uncombined or loosely attached dyestuff components.

According to another embodiment of this invention the polymer structure containing the naphthol coupling component is contacted in an aqueous medium at an elevated temperature with a diazotized base component for a sufficient time to cause the coupling component to couple with the base component.

Where molded articles are concerned, it is preferred to develop the color prior to molding. On the other hand, one may extrude the polymer modified with the coupling components into fibers, filaments, films, and the like by known methods and then contact the thus-formed object with the diazotized base component.

The following examples are given to illustrate the present invention and are not to be construed as limiting the invention thereto.

*Example I*

One part of Naphthol AS, the anilide of 2,3-oxynaphthoic acid, (3.5 g.) was mixed with 94 parts of acrylonitrile (334 g.) and 6 parts vinyl acetate (21 g.). The resulting mixture was subjected to suspension type polymerization conditions using a potassium persulfate-sulfur dioxide and iron catalyst system. The polymerization was carried out by adding the mixture to an aqueous medium maintained at 50° C. over a two-hour period. The catalyst was likewise added over a period of two hours. The polymer thus formed was recovered by filtration and thoroughly washed with water, alcohol, and acetone and then dried at 50° C. to a constant weight.

The polymer in granular form was dispersed in water containing acetic acid and having a pH of 4.0. The base component, Fast Orange GC base (meta-chloroaniline hydrochloride) in slight excess of the amount needed to couple with the Naphthol AS employed was separately mixed with the non-ionic dispersing agent, Diazopon AN (polyoxyethylene fatty alcohol), and dissolved in ethanol. This solution was added to the polymer dispersion; the resulting mixture was boiled for 30 minutes and then cooled to room temperature. Formic acid and sodium nitrite were added in requisite amounts to this mixture and the temperature increased to the boiling point. A beautiful orange-red color formed immediately attaining a full color depth in 30 minutes.

The above procedure was employed using the following bases: Fast Scarlet RC base (m-nitro-o-anisidine hydrochloride); Fast Blue BB base (5 amino-2-benzoyl amino- 1,4-diethoxy benzene); and Fast Red RC base (p-chloro-o-anisidine hydrochloride) instead of the Orange base. The colored polymers of this example had a very good lightfastness reading of 5-6. This lightfastness rating is based on the American Association of Textile Chemists' and Colorists' scale of one to eight which is defined in terms of Fadometer exposure hours before a notable break, e.g., No. 1 being 1.25-2.5 hours, No. 2 being 2.5-5 hours, No. 3 being 5-10 hours, and doubling with each number up to No. 8 which represents a lightfastness of 160-320 hours.

Instead of developing the colors in the polymeric granules, the polymer modified with the coupling component was dissolved in the N,N-dimethylacetamide. It will be appreciated that other suitable solvents could also have been used. The resulting solution containing 18 percent by weight of solids was extruded through suitable orifices in a spinneret submerged in a precipitating bath composed of water. The filaments thus formed were withdrawn from the bath and purified by washing to remove any residual solvent. The filaments were immersed in a solution containing excess Fast Orange GC base and about 8 percent sodium nitrite and made slightly acid by acetic acid. This solution was maintained at a temperature near its boiling point, and after thirty minutes a full color had developed in the filaments. Next the filaments were rinsed with water and dried. It was found that these filaments had very high fastness to light.

For comparison, like filaments were produced without the incorporation of the naphthol component in the reaction mixture of monomers. The filaments were dyed with like dye components. It was found that the filaments produced from the polymer having its polymer chains modified with the naphthol component had far superior resistance to fading.

*Example II*

Twenty ml. of acrylonitrile and 0.2 gram of Naphthol AS were dissolved in 100 ml. of N,N-dimethylacetamide, with 0.1 gram of azo-bis-isobutyronitrile being added as a catalyst. The resulting solution was heated to a temperature of 62° C. and maintained at this temperature to polymerize the reactants. The polymer thus formed was coagulated in methyl alcohol, filtered, and thoroughly washed with water, alcohol, and acetone and then dried at 50° C. to a constant weight. The quantity of polymer yielded was 9.3 grams.

The polymer in granular form was dispersed in water containing acetic acid and having a pH of 4.0. The base component, Fast Violet B base (6-benzoylamino-4-methoxy-m-toluidine), in slight excess of the amount needed to couple with the Naphthol AS employed was separately mixed with polyoxy-ethylene fatty alcohol and dissolved in ethanol. This solution was added to the polymer dispersion; the resulting mixture was boiled for 30 minutes and then cooled to room temperature. Formic acid and sodium nitrite were added to this mixture and the temperature increased to the boiling point. A beautiful reddish-brown color formed immediately attaining a full color depth in 30 minutes.

The above procedure was employed using the following bases: Fast Red KB base (p-chloro-o-toluidine) and Fast Blue B base (dianisidine). Respectively, orange and reddish-brown colors were developed. The lightfastness of the polymers colored in this example was very good.

*Example III*

The procedure described above in Example II was repeated except that Naphthol AS-SW (the β-naphthalide of 2,3-oxynaphthoic acid) was employed as the coupling component. With Fast Violet B base, Fast Red KB base, and Fast Blue B base, polymers having fast colors of reddish-brown, reddish-orange, and a very dark red, respectively, were produced.

*Example IV*

The procedure described above in Example II was repeated except that Naphthol AS-D (o-toluidide of 2,3-oxynaphthoic acid) was employed as the coupling component. With Fast Violet B base, Fast Red KB base, and Fast Blue B base, polymers having fast colors of maroon, light orange, and a very dark red, respectively, were produced.

*Example V*

Twenty ml. of methyl methacrylate and 0.2 gram of Naphthol AS were polymerized under conditions described in Example I. The resulting polymer was purified; and portions of the polymer were treated in the manner described in Example I with Fast Violet B base, Fast Red KB base, and Fast Blue B base. Fast colors were developed in the polymer.

*Example VI*

Twenty ml. of vinylidene chloride and 0.2 gram of Naphthol AS were polymerized under conditions described in Example I. The polymer was purified; and portions of the polymer were treated in the manner described in Example I with Fast Violet B base, Fast Red KB base, and Fast Blue B base. Very fast colors were developed in the polymer.

The present invention provides a method of coloring vinyl polymers that are very fast to light. The coupling component is chemically bound to the polymer during polymerization thereof with the color being developed in situ by coupling a diazotized base therewith. A large range of colors may be conveniently and easily produced in vinyl polymers heretofore regarded as being difficult to dye.

When the above examples are repeated with other of the defined naphthol coupling components and naphthol base components and in the amounts set forth hereinbefore, similar excellent results are obtained. Therefore, the invention is not intended to be limited solely to the details of the embodiments set forth above as it will be recognized by the man skilled in the art that numerous and obvious modifications conforming to the spirit of the invention may be made and it is intended that the invention be limited solely by the scope of the appended claims.

What is claimed is:

1. A method of preparing and dyeing filaments from a vinyl polymer having fiber-forming properties comprising polymerizing a monomeric vinyl compound in the presence of a naphthol coupling component to form a polymer therefrom, shaping said polymer into filaments, immersing the filaments thus formed into a bath containing a diazotized base component that couples in the filaments with the coupling component to form a lightfast color therein.

2. A method of preparing and dyeing filaments from a vinyl polymer having fiber-forming properties comprising polymerizing acrylonitrile and another mono-olefinic monomer copolymerizable therewith in the presence of the anilide of 2,3-oxynaphthoic acid to form a polymer therefrom having a molecular weight in excess of 10,000, dissolving said polymer in a solvent therefor, extruding the polymer solution into a precipitating bath to form filaments therefrom, withdrawing said filaments from said bath and purifying same, and thereafter immersing the purified filaments in a bath containing a diazotized base component that couples in the filaments with said anilide to form a lightfast color therein.

3. The method according to claim 2 where the base component is meta-chloroaniline hydrochloride.

4. A method of preparing and dyeing a vinyl polymer having fiber-forming properties comprising reacting a vinyl compound in the presence of a naphthol coupling component to form a polymer therefrom, immersing said polymer in an aqueous bath containing a diazotizable base component to impregnate said polymer with said bath, adding an acid and an alkali metal nitrite to said bath to diazotize said base component, maintaining said polymer in said bath under conditions such that said coupling component couples with the diazotized base to form a lightfast color therein.

5. A method according to claim 4 where the vinyl compound is acrylonitrile.

6. A method according to claim 5 where the naphthol coupling component is the anilide of 2,3-oxynaphthoic acid.

7. The method according to claim 6 where the base component is the β-naphthalide of 2,3-oxynaphthoic acid.

References Cited in the file of this patent

UNITED STATES PATENTS

| | | |
|---|---|---|
| 2,500,023 | Burk | Mar. 7, 1950 |
| 2,822,359 | Straley | Feb. 4, 1958 |

FOREIGN PATENTS

| | | |
|---|---|---|
| 611,662 | Great Britain | Nov. 2, 1948 |

OTHER REFERENCES

Kelton: Modern Plastics, August 1954, pp. 99–100.

Speel: "Textile Chemicals and Auxiliaries," 2nd Ed., Reinhold Pub. Corp., New York, 1957, pp. 80–82.